J. W. MELCHER.
Car Coupling.
No. 76,494.
Patented April 7, 1868.
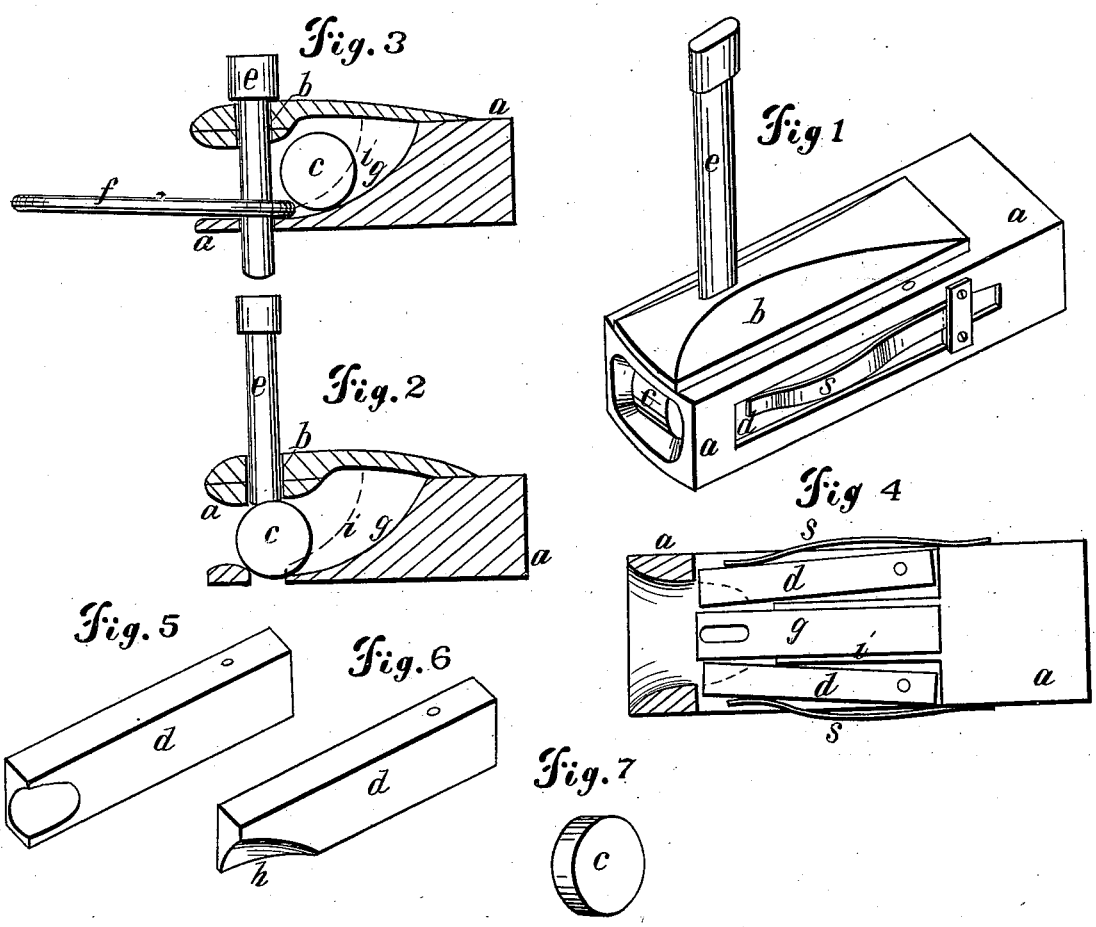
Witnesses.
Inventor.

United States Patent Office.

JOHN W. MELCHER, OF OSHKOSH, WISCONSIN.

Letters Patent No. 76,494, dated April 7, 1868.

IMPROVED CAR-COUPLING.

The Schedule referred to in these Letters Patent and making part of the same.

TO ALL WHOM IT MAY CONCERN:

Be it known that I, JOHN W. MELCHER, of the city of Oshkosh, State of Wisconsin, have invented a new and improved Mode of Coupling Cars; and I do hereby declare that the following is a full and exact description thereof, reference being had to the accompanying drawings, and to the letters of reference marked thereon, in which—

Figure 1 is a perspective view.
Figures 2 and 3 are vertical longitudinal sections.
Figure 4 is a horizontal section.
Figures 5 and 6 are different forms of spring-guides.
Figure 7 is a disk-shaped weight.

$aa$ is the draw-head. $b$ is a cap, and affords a seat for coupling-pin, $e$. C is a disk-shaped weight with a straight face. $dd$, fig. 4, are guides to coupling-link, provided with springs S S. $f$ is a coupling-link. $g$ is a groove, wherein the disk C traverses. $ii$, figs. 2, 3, and 4, are the sides of the groove $g$.

My invention consists in the use of draw-heads that are counterparts of each other, acting as a self-coupler, each provided with right and left spring-guides $dd$, and also with an inclined groove, $g$, wherein a straight-faced disk of metal, $c$, traverses. When cars are to be coupled, the disk in one draw-head rolls down to a position, so as to cover the lower mortise or seat of the coupling-pin, and thus supports the pin when the latter is inserted in the upper mortise or seat of the coupling-pin, as seen in fig. 2.

In the opposite draw-head, the pin and link are in full position, the disk $c$ resting on one end of the link, and thus by its weight maintaining the link in position, as seen in fig. 3. The two coming in contact, the coupling-link $f$, fig. 3, displaces the disk $c$, fig. 2, and the coupling-pin $e$ drops in the link, and thus the cars are automatically coupled. The right and left spring-guides $dd$ guide the link to a central position, so as to effect certainty of the pin catching the link. The form of the spring-guide $d$, fig. 6, is presented as a device to be used at option in the place of $d$, fig. 5. By kerfing off the lower corner, substantially as seen at $h$, the spring-guides may be made either to assist or wholly within themselves to maintain the coupling-link in a horizontal position when in the act of coupling, and may also be so constructed, by widening the top, as to serve as a support of the pin $e$, fig. 2, in place of the disk $c$.

What I claim as my invention, and desire to secure by Letters Patent, is—

The disk $c$, in combination with the groove $g$, guides $dd$, and springs S S, in connection with the pin $e$, draw-head $a$, and link $f$, when arranged and constructed substantially as described.

JOHN W. MELCHER.

Witnesses:
W. G. RITCH,
GEO. W. BURNELL.